March 4, 1969  J. W. KING  3,430,366
EARTH-WORKING DEVICE
Filed Jan. 17, 1966  Sheet 1 of 2
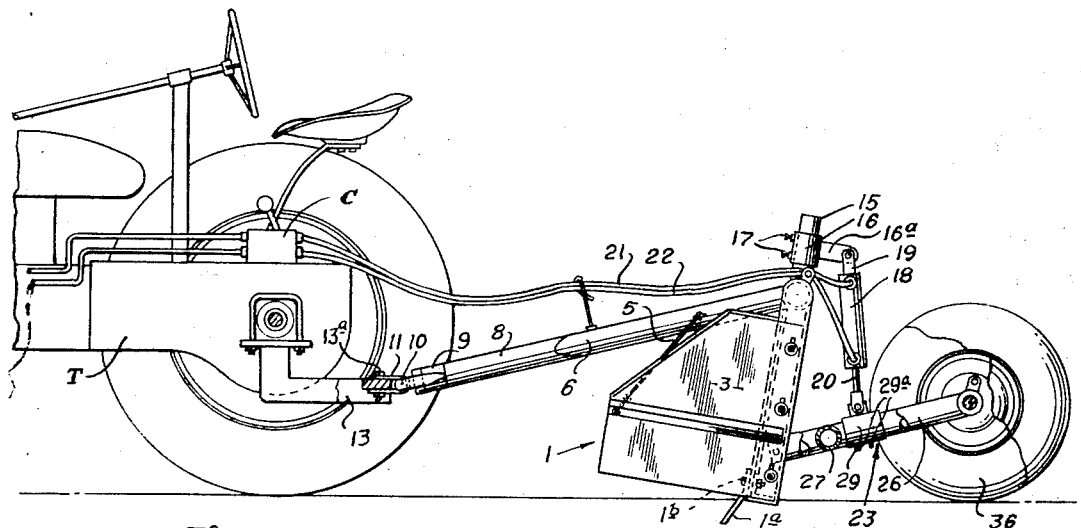
Fig. I
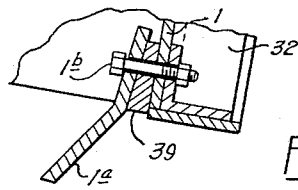
Fig. IX
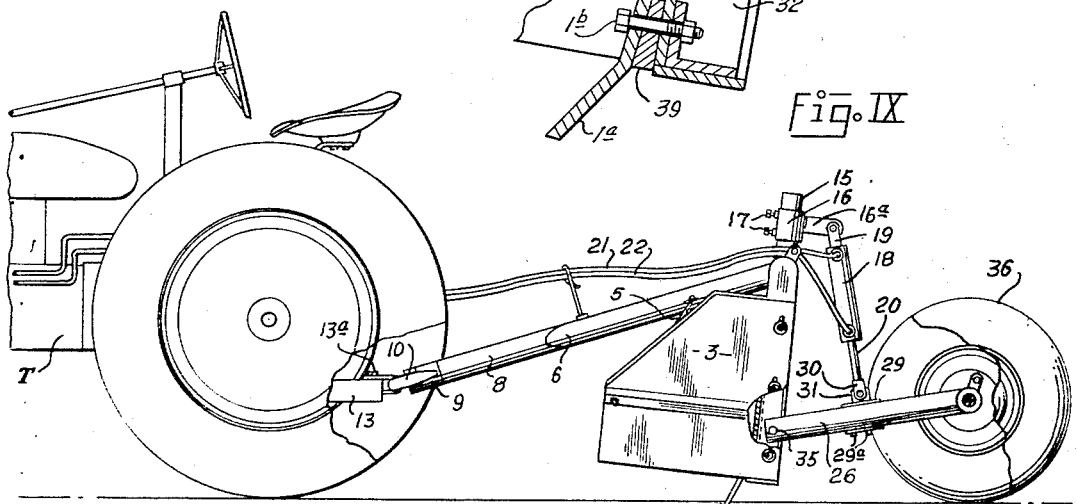
Fig. II
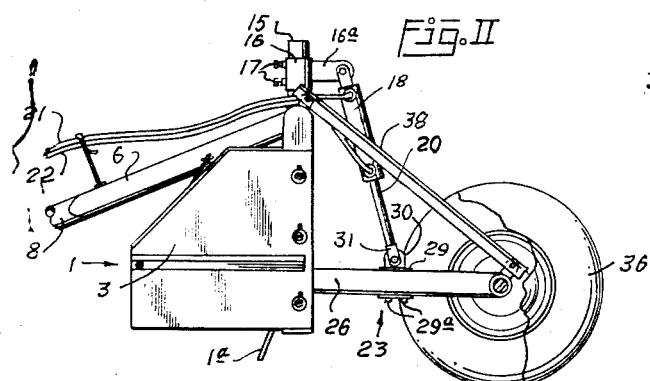
Fig. III
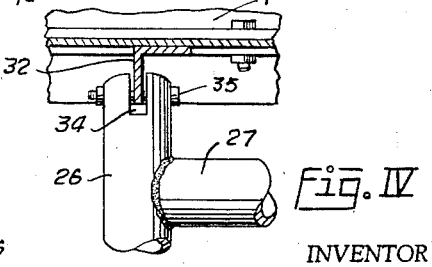
Fig. IV
INVENTOR
J. W. King
BY Howard E. Moore
ATTORNEY

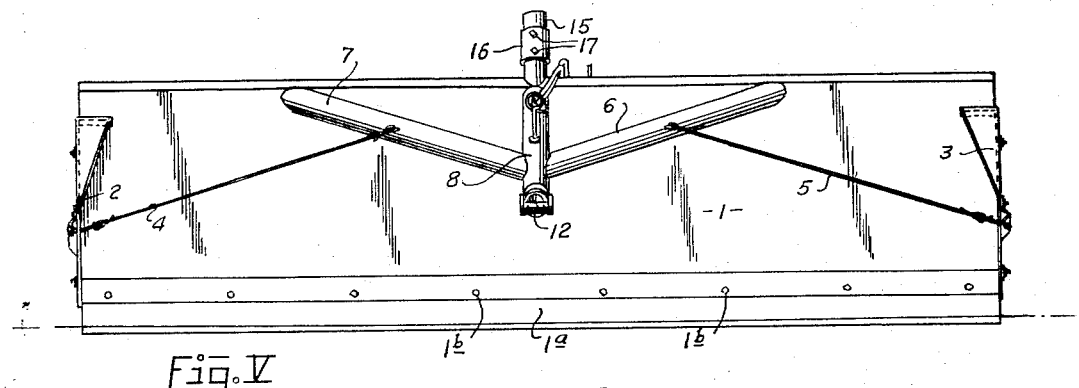
Fig. V
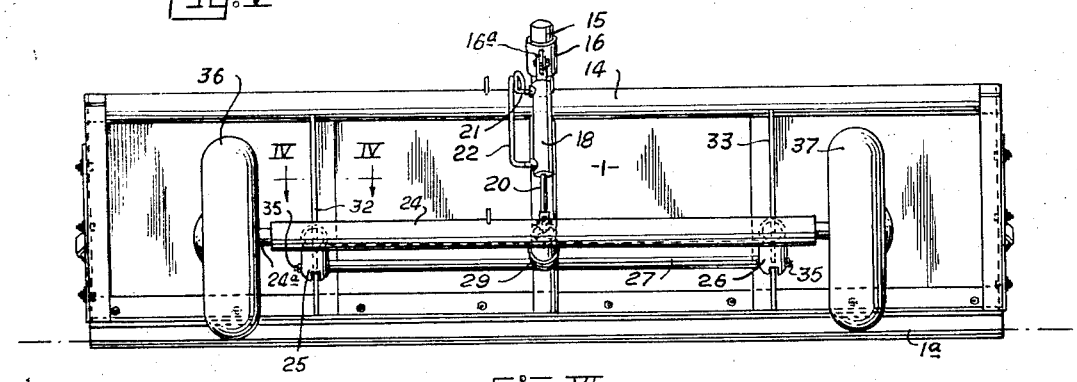
Fig. VI
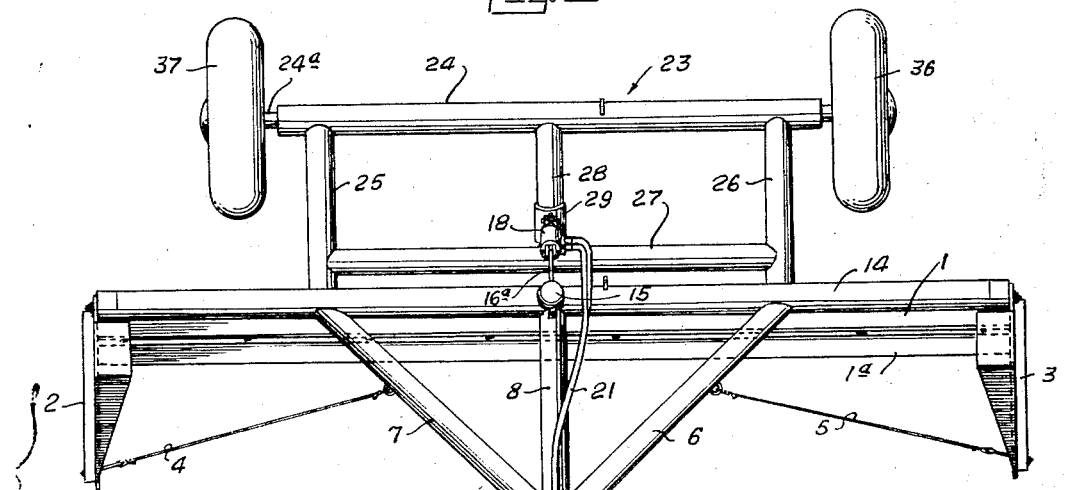
Fig. VII
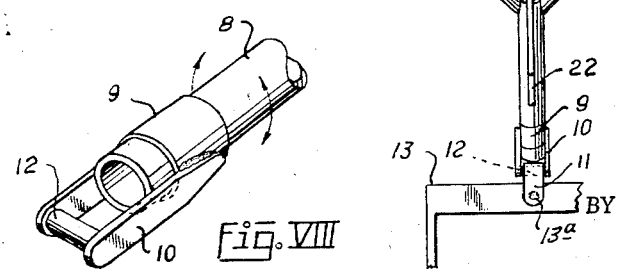
Fig. VIII
INVENTOR
J. W. King
Howard E. Moore
BY
ATTORNEY

United States Patent Office 3,430,366
Patented Mar. 4, 1969

3,430,366
EARTH-WORKING DEVICE
J. W. King, Quitaque, Tex., assignor to King Machinery & Sales Co., Inc., Quitaque, Tex., a corporation of Texas
Filed Jan. 17, 1966, Ser. No. 521,009
U.S. Cl. 37—129                                            8 Claims
Int. Cl. E02f 3/76

ABSTRACT OF THE DISCLOSURE

An earth-working device having a hydraulically actuated cylinder pivotally secured between movable adjustment members connected to the scoop and the wheel frame pivotally connected behind the scoop, whereby the speed of the blade travel and the height of setting of the blade may be regulated by adjusting the relative positions of the adjustment members.

---

This invention is concerned with an earth-working device and is particularly concerned with a tractor-towed earth moving and distribution device in which the angle of the blade and the height thereof with relation to the ground may be quickly and accurately adjusted and manipulated while the device is in forward motion.

The device is particularly useful in the making and mending of terraces, but it will be understood that it has a general application for the moving, distribution and leveling of soil for any purpose whatsoever.

Conventional graders and tractor-mounted earth-working blades have been generally unsatisfactory for building and mending terraces or other embankments, because no provision has been made for quickly adjusting the height and angularity of the blade as the device is in forward motion. Moreover, such prior devices have failed to provide means for allowing the blade to automatically adjust itself in horizontal position in response to variations in the contour of the ground and different height positions of the wheels of the towing vehicle and of the wheels on the grader or other earth-working device.

The present invention provides a towed earth-working device wherein the same is attached to the towing vehicle by a universal connection, which permits the blade to automatically adjust itself in horizontal position in response to different height positions of the wheels on the towing vehicle or on the earth-working device.

The wheels for the earth-working device extend rearwardly of the blade and are pivotally attached thereto, and there is a hydraulically controlled cylinder extending between the upper portion of the blade and the wheels support assembly so that by contracting or extending the hydraulically controlled means the height and angularity of the blade with reference to the ground may be quickly adjusted by hydraulic force supplied from the towing vehicle as the vehicle is in forward motion.

Thereby the height and angularity of the blade may be adjusted by remote control from the towing vehicle to the end that earth may be picked up, moved and distributed more quickly and uniformly than has been possible with the use of prior devices.

Other and further objects of the invention will become apparent upon reading the detailed specification hereinafter following and by referring to the drawings annexed hereto.

A suitable embodiment of the invention is shown in the attached drawings wherein:

FIGURE I is a side elevational view of a device incorporating the invention which is attached to a tractor, FIGURE II is a side elevational view of the device attached to a tractor with the blade in partially raised position and disposed at a different angle from that shown in FIGURE I, FIGURE III is a side elevational view of the device showing the blade in fully raised position with the towing brace attached between the upper side of the blade and the wheel support frame, FIGURE IV is a fragmentary, partially sectionalized top plan view of the pivotal connection between the wheel frame and the rear side of the blade support, FIGURE V is a front elevational view of the device, FIGURE VI is a rear elevational view of the device, FIGURE VII is a top plan view of the device; and FIGURE VIII is a perspective view of the swivel connection on the outer end of the draw bar, and FIGURE IX is an alternate form showing means to adjust the angularity of the blade with reference to the mold board.

Numeral references are employed to indicate the various parts shown in the drawings and like numerals indicate like parts throughout the various figures of the drawings.

The numeral 1 indicates an elongated scoop having end plates 2 and 3 attached to each end thereof.

A detachable blade 1a is attached to the lower edge of the rear wall of the scoop by means of suitable bolts 1b, and is arranged to extend angularly downwardly below the scoop whereby it may penetrate the earth and sever the soil therefrom when lowered into engagement therewith.

The brace cables 4 and 5 extend from the end plates 2 and 3 and are secured to the tow braces 6 and 7, in order to maintain the ends 2 and 3 in fixed position with reference to the moldboard.

A draw bar 8 is secured to the upper edge 14 of the scoop assembly and is rigidly braced by means of the angular braces 6 and 7 which are secured at their inner ends to the scoop assembly and at their outer ends to the draw bar 8.

A rotatable ring 9 is provided about the outer end of the draw bar 8, said ring 9 having a clevis welded at opposite sides thereof. The clevis 10 extends outwardly of the end of the draw bar 8 and is closed at its outer end by a pin 12 welded therebetween.

A clevis 11 is passed about the pin 12 and is secured to the tractor hitch 13 by means of a bolt 13a.

The upper edge of the scoop 1 is braced and supported by a tubular member 14.

A post 15 is secured to the upper edge of the scoop 1 and extends upwardly thereof substantially centrally thereof.

A sleeve 16 is secured about the post 15, and is adjustable vertically thereon, and may be fixed in adjusted relationship thereto by means of the set screws 17.

A hydraulic ram 18 includes a cylinder having a fixed attachment lug 19 thereon which is pivotally attached to a lug 16a secured to and extending outwardly from the sleeve 16.

A piston rod 20 extends outwardly of the outer end of the ram cylinder 18 and is moved inwardly and outwardly thereof by hydraulically actuated piston (not shown) disposed in the cylinder.

Hydraulic fluid is supplied through the hydraulic lines 21 and 22, communicating with opposite ends of the ram cylinder 18, the direction of flow of said hydraulic fluid, to actuate the piston rod 20, being controlled by the control C on the tractor. Hydraulic fluid is supplied by conventional hydraulic equipment on the tractor T. It will be obvious that by applying hydraulic force through the hydraulic line 21 to the upper end of the cylinder 18 the piston therein will be moved downwardly to move the rod 20 outwardly thereof, and by reversing the flow of hydraulic fluid hydraulic force may be applied through the line 22 to lower end of the piston in cylinder 18 to cause the rod 20 to move inwardly thereof.

A wheel frame, generally indicated at 23, includes a tubular axle support 24 in which the axle 24a is attached, and on which the wheels 36 and 37 rotate.

The wheel frame also includes spaced side frame members 25 and 26 attached to the axle support 24 and pivotally attached to the rear face of the scoop 1 in the manner hereinafter described.

A transverse brace 27 extends between the side frame members 25 and 26, and a central brace member and support 28 extends between the axle support 24 and the transverse brace 27 substantially centrally thereof.

A sleeve 29 is adjustably secured about the central frame member 28 by set screws 29a, and has a bifurcated lug 31 secured thereto and extending upwardly thereof. A lug 30 is secured to the outer end of the piston rod 20 and is pivotally secured between the sides of the bifurcated lug 31.

FIGURE IV illustrates the pivotal attachment between the inner ends of the side frame members 25 and 26 and the rear wall of the scoop. A pair of spaced angle members are secured to the rear surface of the back wall of the scoop 1, providing outwardly extending ribs 32 and 33 thereon.

A slot 34 is provided in the end of each side frame member 25 and 26, and each slot receives one of the ribs 32 and 33 which are pivotally attached therein by means of pivot bolts 35.

Thus, it will be seen that the wheel frame 23 is pivotally attached to the rear wall of the scoop near the lower edge thereof.

The operation and function of the device hereinbefore described is as follows:

The draw bar 8 is attached to the tractor hitch in the manner shown in FIGURES I and II.

Normally when the device is not in use, or is being towed from one location to the other, the wheel frame 23 and the scoop 1 are maintained in horizontal raised position by means of a detachable towing brace 38 extending between the wheel frame and the upper edge of the scoop. The brace 38 is removed prior to using the device for moving and distributing soil.

The blade 1a may be lowered into penetrating engagement with the earth, as shown in FIGURE I, by actuating the hydraulic ram so as to withdraw the piston rod 20 into the cylinder 18, thereby pivoting the frame 23 upwardly, raising the wheels 36 and 37, causing the scoop 1 to be lowered. In such position, the scoop may be filled with soil as the scoop 1 is pulled forwardly to cause blade 1a to remove the soil and direct it upwardly into the scoop. It will be noted at this point that the penetrating engagement of the blade 1a with the earth may be minutely regulated by manipulating the control C, thereby varying the depth of the penetration of the blade 1a and the angular relationship thereof with the earth.

As the device is pulled forwardly the scoop 1 may be raised by manipulating the hydraulic control so as to extend the piston rod 20 and push the wheels 36 and 37 downwardly, thereby raising the scoop and the blade 1a. By manipulation of the control C, the soil in the scoop may be evenly distributed as the blade 1a is raised and same may be smoothed out while the device is in forward motion. If it is desired to dump the entire load of dirt within the scoop at one place, the piston rod 20 may be fully extended to thereby raise the scoop 1 to the fullest extent as shown in FIGURE III. However, normally the device would be used to gradually distribute the earth within the scoop as it is pulled forwardly.

It will be noted further that the angularity of the blade 1a is varied by the lowering and raising of the wheel frame and, therefore, the amount of dirt and extent of penetration thereof may be exactly regulated.

Referring to FIGURES II and III of the drawing, it should be readily appreciated that the position of sleeve 16 may be adjusted vertically along post 15 or sleeve 29 may be adjusted longitudinally along central frame member 28, thereby adjusting the distance traveled by blade 1a from the fully extended to the fully retracted position of piston rod 20 in cylinder 18. It should also be apparent that the speed at which blade 1a travels upwardly varies with adjustment of sleeve 29. The speed at which the dirt is dumped regulates the slope of the terrace.

For example, positioning sleeve 29 forwardly toward transverse brace 27 increases the speed of vertical movement of blade 1a and thereby increases the angle of the slope. Adjustment of sleeve 29 rearwardly toward axle support 24 reduces the speed of vertical travel of blade 1a and reduces the angle of the slope.

Adjustment of sleeve 16 at a higher position on member 15 lowers the height at which the blade is set and increases the penetration thereof, and adjustment at a lower height increases the height at which the blade is set and reduces the penetration thereof. This adjustment regulates the height of the blade with reference to the surface and thereby controls the penetration of the blade and thus the volume of dirt picked up by the scoop.

These adjustments may be made before beginning each particular job to suit the particular requirements for slope and height, and eliminates the necessity of constant manipulation of the hydraulic cylinder in an attempt to secure the right slope and height of the terrace or embankment.

It will further be observed that the draw bar 8 is rotatably connected with relation to the tractor hitch, and therefore, as the device is towed forward the blade 1a may be maintained in horizontal position even though the tractor wheels may be on different horizontal levels, and the draw bar 8 is hingedly attached to the tractor hitch so that even though the tractor is at a lower level than the scoop 1, the scoop will, nevertheless, be maintained in horizontal position within certain limits.

FIGURE IX is a modified form showing means to adjust the blade 1a angularly with reference to the rear wall of the scoop. As shown a wedge shaped shim 39 may be placed between the scoop wall and the blade base to change the angle of the blade 1a with reference to the rear wall of the scoop. The bolt 1b passes through a hole in the shim to retain same in place.

It will thus be seen that I have provided an earth moving and distributing device which may be controlled from a remote position to exactly regulate the amount of soil picked up and the even distribution thereof, and which may be maintained in level position even though the towing vehicle is at a lower horizontal level or the wheels thereof are not on the same horizontal plane.

It will be seen that I have provided a device of the type indicated which is simple and easy to manipulate and which performs the job better than devices previously used for this purpose.

It will be understood that other and further embodiments of the invention may be devised without departing from the spirit and scope of the appended claims.

Having described my invention I claim:

1. In an earth-working device, a scoop; a blade attached to the lower edge of the scoop and extending angularly downwardly thereof; a wheel frame extending rearwardly of the scoop and being pivotally attached thereto; wheels at the rear of said frame; first adjustment means secured to the upper side of the scoop and being adjustable vertically with reference thereto; second adjustment means adjustably secured to the wheel frame, and being adjustable longitudinally with reference thereto; extensible and contractible hydraulically actuated means pivotally attached between the first and second adjustment means; a forwardly extending draw bar attached to the scoop, and means on the outer end of the draw bar adapted to be attached to a towing vehicle.

2. The combination called for in claim 1 wherein the means on the outer end of the draw bar adapted to be attached to the towing vehicle is rotatable with reference to the draw bar, and is hingedly attached to the towing vehicle.

3. The combinaion called for in claim 1 wherein the wheel frame is attached to the scoop below the horizontal center line thereof.

4. The combination called for in claim 1 wherein the draw bar is attached to the upper edge of the scoop.

5. The combination called for in claim 1 with the addition of a detachable brace between the wheel frame and the scoop.

6. The combination called for in claim 1 wherein the wheel frame is rectangular and includes spaced side members having forward ends pivotally attached to the scoop, and a transverse axle support member with a wheel mounted at each end thereof.

7. The combination called for in claim 1 with the addition of means to adjust the angle of the blade with reference to the lower edge of the scoop.

8. In an earth-working device, a scoop; a blade attached to the lower edge of the scoop and extending angularly downwardly thereof; a wheel frame extending rearwardly of the scoop and being pivotally attached thereto; wheels at the rear of said frame; an attachment member extending upwardly of the upper side of the scoop; a sleeve adjustable vertically on the attachment member; the wheel frame being rectangular in shape with side members pivotally attached to the scoop; a rear transverse member extending between the side members and supporting the wheels; a forward transverse member extending between the side members; a central longitudinal member extending between the forward transverse member and the rear transverse member; and a sleeve adjustable on the central frame member; extensible and contractable hydraulically actuated means with the upper end thereof attached to the sleeve on the attachment member and having he lower end thereof attached to the sleeve on the central frame member.

References Cited

UNITED STATES PATENTS

| | | | |
|---|---|---|---|
| 526,676 | 10/1894 | Bernard | 37—129 |
| 529,501 | 11/1894 | Kelly | 37—129 |
| 1,811,275 | 6/1931 | McMillan | 37—169 |
| 1,886,780 | 11/1932 | Ball | 37—118 |
| 2,441,744 | 5/1948 | Barker | 37—129 |
| 2,450,721 | 10/1948 | Ditzler | 37—129 |
| 2,528,046 | 10/1950 | Engler | 37—129 |
| 2,585,117 | 2/1952 | Gurries | 37—129 XR |
| 2,726,464 | 12/1955 | White et al. | 37—169 |
| 2,730,822 | 1/1956 | Lindbeck | 37—129 |
| 3,097,440 | 7/1963 | Schmidt | 37—129 |
| 3,154,868 | 11/1964 | Buchli | 37—129 |
| 3,200,520 | 8/1965 | Nicholls | 37—129 |
| 3,316,664 | 5/1967 | Wilmoth et al. | 37—129 XR |

EDGAR S. BURR, *Primary Examiner.*